United States Patent [19]
Flournoy et al.

[11] 3,811,504
[45] May 21, 1974

[54] SURFACTANT OIL RECOVERY PROCESS USABLE IN FORMATIONS CONTAINING WATER HAVING HIGH CONCENTRATIONS OF POLYVALENT IONS SUCH AS CALCIUM AND MAGNESIUM

[75] Inventors: Kenoth H. Flournoy; Ricardo L. Cardenas; Gilbert L. Haferkamp; Russell D. Shupe, all of Houston, Tex.

[73] Assignee: Texaco Inc., New York, N.Y.

[22] Filed: Feb. 9, 1973

[21] Appl. No.: 330,933

[52] U.S. Cl. .............................. 166/273, 166/274
[51] Int. Cl. .......................................... E21b 43/22
[58] Field of Search .......................... 166/273–275, 166/305 R; 252/8.55 D

[56] References Cited
UNITED STATES PATENTS

| 3,437,141 | 4/1969 | Brandner et al. | 166/273 |
| 3,434,542 | 3/1969 | Dotson et al. | 166/273 |
| 3,469,630 | 9/1969 | Hurd et al. | 166/273 X |
| 3,500,924 | 3/1970 | Poettmann | 166/273 X |
| 3,634,305 | 1/1972 | Johnson et al. | 166/273 X |
| 3,653,440 | 4/1972 | Reisberg | 166/273 |
| 3,638,728 | 2/1972 | Hill | 166/273 |
| 3,768,560 | 10/1973 | Hill et al. | 166/273 |

Primary Examiner—Stephen J. Novosad
Attorney, Agent, or Firm—T. H. Whaley; C. G. Reis

[57] ABSTRACT

A three component surfactant system usable in the presence of from about 1,500 to about 12,000 parts per million polyvalent ions, such as calcium and/or magnesium, and a method of using said surfactant system for recovering petroleum from subterranean formations, said surfactant system comprising a water soluble salt of an alkyl or alkylaryl sulfonate anionic surfactant plus a water soluble salt of an alkyl polyethoxy sulfate anionic surfactant plus a nonionic surfactant such as a polyethoxylated alkyl phenol, a polyethoxylated aliphatic alcohol or a fatty acid mono- or dialkanolamide.

30 Claims, 3 Drawing Figures

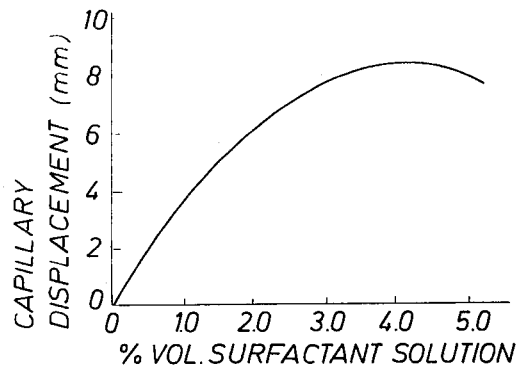
FIG. 1
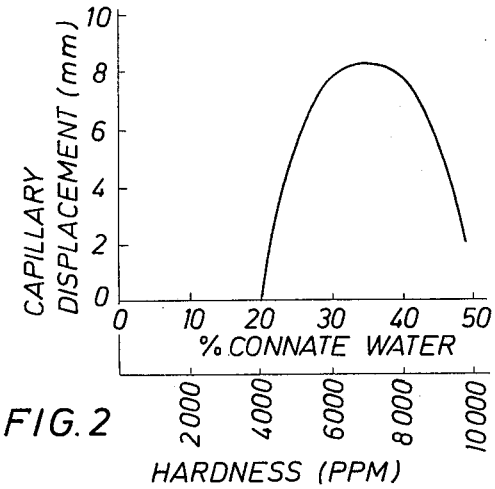
FIG. 2
FIG. 3
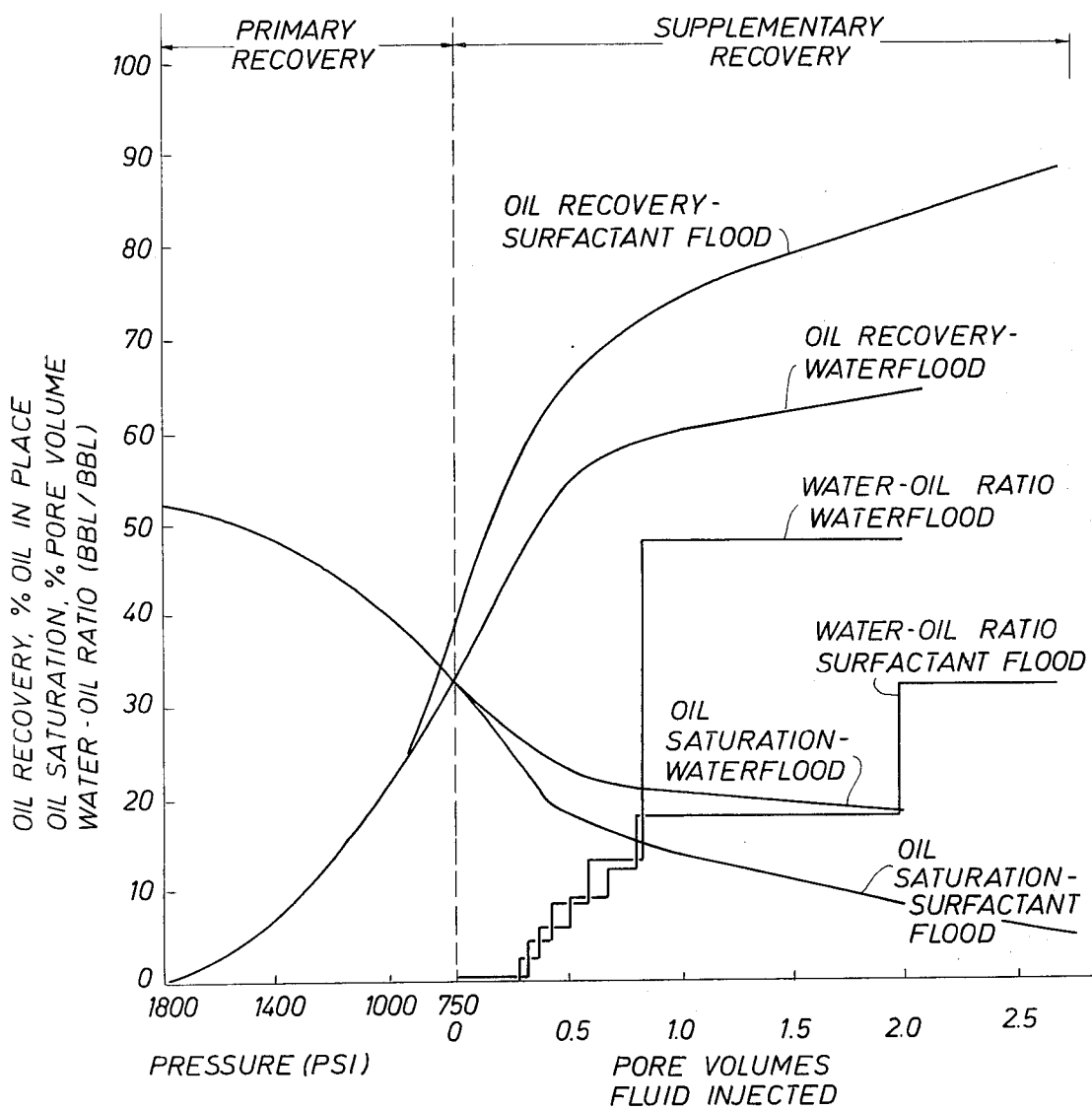

SURFACTANT OIL RECOVERY PROCESS USABLE IN FORMATIONS CONTAINING WATER HAVING HIGH CONCENTRATIONS OF POLYVALENT IONS SUCH AS CALCIUM AND MAGNESIUM

BACKGROUND OF THE INVENTION

1. Field of the Invention

This invention relates to a method for recovering petroleum from subterranean, petroleum containing formations, and more particularly to a surfactant flooding method for recovering petroleum from petroleum containing formations. Still more particularly, this invention pertains to an oil recovery method employing a three component surfactant mixture which will function effectively in the presence of formation water containing high polyvalent ion concentrations, e.g., calcium or magnesium concentrations of from 1,500 – 12,000 parts per million, which cause precipitation of conventional surfactants.

2. Description of the Prior Art

Petroleum is normally recovered from subterranean formations in which it has accumulated by penetrating said formation with one or more wells and pumping or permitting the petroleum to flow to the surface through these wells. Recovery of petroleum from petroleum containing formations is possible only if certain conditions are satisfied. There must be an adequate concentration of petroleum in the formation, and there must be sufficient porosity and permeability or interconnected flow channel throughout the formation to permit the flow of fluids therethrough if sufficient pressure is applied to the fluid. When the subterranean petroleum containing formation has natural energy present in the form of an underlying active water drive, or gas dissolved in the petroleum which can exert sufficient pressure to drive the petroleum to the producing well, or a high pressure gas cap above the petroleum within the petroleum reservoir, this natural energy is utilized to recover petroleum. Recovery of petroleum by utilization of natural energy is referred to as primary recovery. When this natural energy source is depleted, or in the instance of those formations which do not originally contain sufficient natural energy to permit primary recovery operations, some form of supplemental recovery process must be utilized in order to extract petroleum from the subterranean petroleum containing formation. Supplemental recovery is frequently referred to as secondary recovery, although in fact it may be primary, secondary or tertiary in sequence of employment.

Water flooding, which involves the injection of water into the subterranean, petroliferous formation for the purpose of displacing petroleum toward the producing well, is the most economical and widely practiced supplemental recovery method. Water does not displace petroleum with high efficiency, however, since water and oil are immiscible, and also because the interfacial tension between water and oil is quite high. Persons skilled in the art of oil recovery have recognized this weakness of water flooding and many additives have been described in the prior art for decreasing the interfacial tension between the injected water and the formation petroleum. For example, U.S. Pat. No. 2,233,381 (1941) disclosed the use of polyglycol ether as a surface active agent or surfactant to increase the capillary displacement efficiency of an aqueous flooding medium. U.S. Pat. No. 3,302,713 discloses the use of petroleum sulfonate prepared from the 850° to 1,050°F. boiling range fraction of petroleum crude as a surfactant for use in oil recovery operations. U.S. Pat. No. 3,468,377 (1969) describes the use of petroleum sulfonates of a specified molecular weight for oil recovery. Other surfactants which have been proposed for oil recovery include alkylpyridinium salts, alkyl sulfates, alkyl sulfonates, and quaternary ammonium salts.

The above described surfactants are satisfactory for surfactant flooding in petroliferous formations only if the calcium and magnesium concentration of the formation water is below about 500 parts per million. Petroleum sulfonate is one of the most popular and desirable surfactants because of its high surface activity and low unit cost, although it also suffers from the limitation that it can be used only when the total formation water hardness (calcium + magnesium) is less than about 500 parts per million. If the formation water calcium and/or magnesium content exceeds about 500 parts per million, petroleum sulfonates precipitate rapidly. When precipitation of the added material occurs, not only is the desired beneficial result lost, but plugging of the formation will very likely result.

Many subterranean petroleum containing formations are known to exist which contain polyvalent ions such as magnesium and calcium in concentrations far in excess of 500 parts per million. The most common of such reservoirs are limestone formations which may have polyvalent ion concentrations from 1,000 to as high as 20,000 parts per million in the original connate water, and the formation water after a limestone formation has been subjected to flooding with fresh water may have concentrations of calcium and/or magnesium from about 500 to about 15,000 parts per million. Since surfactants usable for oil recovery operations precipitate when exposed to aqueous environments having a total hardness in excess of about 500 parts per million, such surfactants could not be used in limestone reservoirs. If an aqueous solution of petroleum sulfonate, for example, is injected into a limestone reservoir, petroleum sulfonate precipitates immediately on contacting the high calcium containing formation water. In such a process, the flood water would have essentially no surfactant present in it to decrease the interfacial tension between water and petroleum. Furthermore, precipitated petroleum sulfonate plugs the small flow channels in the subterranean petroleum containing formation, decreasing the formation porosity and injectivity, thereby causing a substantial decrease in the oil displacement efficiency.

Nonionic surfactants, such as polyethoxylated alkylphenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use would not be economically feasible for several reasons. Nonionic surfactants are not as effective on a unit weight basis as are the more commonly used anionic surfactants, and furthermore, the nonionic surfactants have a higher cost per unit weight than do the anionic surfactants.

Thus it can be seen that while many surfactants have been proposed for supplemental oil recovery use, there is a substantial, unfulfilled need for an oil recovery method employing a surfactant composition usable in the presence of formation waters containing calcium and/or magnesium in excess of 500 parts per million.

SUMMARY OF THE INVENTION

This invention pertains to a novel oil recovery method using a three component surfactant system usable in petroleum containing formations containing water having a polyvalent ion content, for example calcium and/or magnesium, in the range of from about 1,500 to about 12,000 parts per million. The surfactant system is comprised of an aqueous solution of from about 0.05 to about 5.0 percent by weight of an anionic surfactant such as a water soluble salt of an alkyl or an alkylaryl sulfonate, for example sodium dodecylbenzene sulfonate, plus from about .05 to about 5.0 percent by weight of a water soluble salt of an alkyl polyethoxylated sulfate anionic surfactant such as sodium dodecyl polyethoxy sulfate, plus from about 0.5 to about 5.0 percent by weight of a nonionic surfactant such as a fatty acid diethanolamide, a polyethoxylated aliphatic alcohol, or a polyethoxylated alkylphenol. From about 2 percent pore volume to about 50 percent pore volume of the aqueous surfactant solution is injected into the formation. The surfactant solution may be displaced through the formation by injecting water, or it may be followed immediately by a quantity of thickened water for mobility ratio control, which is in turn displaced through the formation with water. Our invention therefore incorporates the method of using the three component surfactant system for the recovery of petroleum from subterranean petroleum containing formations having a polyvalent ion concentration in the formation water from 1,500 to about 12,000 parts per million.

BRIEF DESCRIPTION OF THE DRAWINGS

FIG. 1 illustrates the result of a series of capillary displacement tests utilizing an aqueous solution having 6,000 parts per million total hardness with varying concentrations of the three component surfactant system of this invention.

FIG. 2 illustrates the results of a series of capillary displacement tests utilizing a 4 volume percent aqueous solution of the three surfactants with the total hardness varied from 0 to 10,000 parts per million.

FIG. 3 gives the results of laboratory core displacement tests illustrating the percent oil recovery, oil saturation, and water-oil ratio for a conventional water flood and for the novel three component surfactant system flood of this invention.

DESCRIPTION OF THE PREFERRED EMBODIMENTS

This invention concerns a three component surfactant system which can be used in subterranean petroleum containing formations which also contain "hard water," or water having polyvalent ions such as calcium and/or magnesium dissolved therein in a concentration of from about 1,500 to about 12,000 parts per million. There are many petroleum containing formations which contain water having calcium and/or magnesium concentrations in the range from about 1,500 to about 12,000 parts per million, the most common of such formations being limestone formations. These formations frequently contain a substantial amount of petroleum after primary production and after water flooding, but conventional surfactant flooding cannot be employed in them because surfactants previously proposed for oil recovery are insoluble or otherwise ineffective in the presence of calcium and/or magnesium in the range of from 1,500 to 12,000 parts per million.

We have found that an aqueous solution of three surfactant materials, in a critical concentration range, will effectively reduce the surface tension between oil and water, and will function effectively in the presence of calcium and magnesium in a concentration of from about 1,500 to about 12,000 parts per million total hardness. The three surfactant system comprises 1. A first anionic surfactant having one of the following general formulas:

(a) $R - SO_3^- - Y^+$ (alkyl sulfonate)

wherein R is an alkyl radical, linear or branched, having from five to 25 and preferably from eight to 14 carbon atoms, and Y is a monovalent cation such as sodium, potassium or ammonium, or (b) 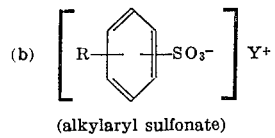

(alkylaryl sulfonate)

wherein R and Y have the same meaning as above. For example, if R is linear dodecyl and Y is ammonium, the material is ammonium linear dodecylbenzene sulfonate. Petroleum sulfonates may also be used as the first anionic surfactant in this invention.

2. A second anionic surfactant having the following general formula:

$[R' - (OCH_2CH_2)_n - SO_4]^- Y^+$ (alkyl polyethoxylated sulfate)

wherein R' is an alkyl radical, linear or branched, having from seven to 20 carbon atoms, n is an integer from 1 to 10 and Y is a monovalent cation such as sodium, potassium or ammonium.

3. A nonionic surfactant having one of the following structures:

(a) 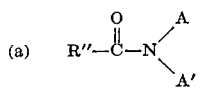

wherein R'' is an alkyl radical, linear or branched, having from five to 20 and preferably eight to 14 carbon atoms, A and A' are independently selected from the group consisting of hydrogen and alkanols having from one to 10 carbon atoms. For example, dodecyldiethanolamide, lauryldiisopropanolamide, laurylmonoethanolamide, or laurylmonoisopropanolamide are preferred materials for use in this surfactant system.

(b) 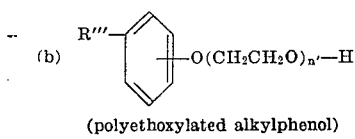

(polyethoxylated alkylphenol)

wherein R''' is an alkyl radical having from five to 20 and preferably eight to 14 carbon atoms, and n' is an integer from 6 to 20.

c. R'''' O(CH$_2$CH$_2$O)$_n$'' H (polyethoxylated aliphatic alcohol)

wherein R'''' is an alkyl chain having from five to 20 and preferably from eight to 14 carbon atoms and n'' is an integer from 6 to 20.

The term surfactant encompasses a broad spectrum of materials which share the following common characteristics:

1. The material must be at least slightly soluble in at least one phase of a liquid system, 2. The material must have an amphipathic structure (the molecule is composed of groups with opposing solubility tendencies). For use in supplemental oil recovery operations, the molecule must have at least one hydrophobic or oil soluble group and at least one hydrophilic or water soluble group.

3. The surfactant molecules or ions must form oriented monolayers at phase interfaces.

4. The equilibrium concentration of the surfactant in any particular solute at the phase interface is greater than the concentration of the surfactant in the bulk of the solution.

5. The material must tend to form micelles or aggregates of molecules or ions whenever the concentration exceeds a certain limiting value which is a characteristic of the particular surfactant and solute.

6. The material must exhibit some combination of the following functional properties: detergency, foaming, wetting, emulsifying, solubilizing and dispersing.

Surfactants are generally classified on the basis of the type of hydrophilic or water soluble group or groups attached to the molecule, generally being classified as anionic, cationic or nonionic, as described below more fully.

1. Anionic surfactants are those surfactant materials wherein the hydrophilic or water soluble group is a carboxylate, sulfonate, sulfate or phosphate group. This is the most important class of surfactants. Anionic surfactants are readily available, inexpensive, and have a high degree of surface activity. Petroleum recovery operations will generally involve the use of anionic surfactants unless there is some objection to the use of anionic surfactants, or some sufficient reason to resort to the use of some other compound. Petroleum sulfonates are currently very popular anionic surfactants for oil recovery, and are prepared by isolating a preselected boiling range fraction of a crude oil and subjecting it to sulfonation. Although this material is desirable for use because of its low unit cost, there are problems associated with the use of petroleum sulfonates because of the complex nature of the hydrophobic or oil soluble portion of the molecule, as well as the limited tolerance for calcium and magnesium.

2. Cationic surfactants employ primary, secondary, or tertiary amines, or quaternary ammonium groups, as the hydrophilic or water soluble group. 3. Nonionic surfactants are materials which have no charge when the material is dissolved in an aqueous medium. The hydrophilic tendency is derived from oxygen atoms in the molecule which hydrate by hydrogen bonding to water molecules present in the solute. The strongest hydrophilic moiety in this class of surfactants is the ether linkage, and there must be a plurality of these linkages present to render the compounds sufficiently water soluble to permit the compound to exhibit surface activity. Polyoxyethylene surfactants having the following recurring ether linkages are examples of hydrophilic moieties for nonionic surfactants:

— CH$_2$CH$_2$OCH$_2$CH$_2$O —

A nonionic surfactant molecule may have more than one chain containing ether linkages and generally as much as 60 to 70 percent by weight of the molecule must be in the form of ether linkage containing chains in order to render the molecule sufficient water soluble for it to function as a surfactant. It can be readily seen that the presence of these large chains containing the ether linkages in addition to the relatively long aliphatic or other hydrophobic chains results in a high molecular weight compound, and this is one reason that nonionic surfactants have a low surface activity per unit weight of material.

Nonionic surfactants are more efficient in the presence of high concentrations of calcium and magnesium than are either anionic or cationic surfactants, and it is possible to conduct a surfactant flood operation in some subterranean limestone formations or other subterranean petroleum containing formation wherein the formation water contains substantial quantities of calcium and/or magnesium, above 1,500 parts per million, although they cannot tolerate calcium and/or magnesium levels of the upper part of the hardness range encountered in limestone formations. Nonionic surfactants are also not particularly desirable for use as the sole surfactant because of their high cost per unit weight and low surface activity.

The optimum concentration of each material which constitutes the novel surfactant system of our invention will vary to a degree depending on the hardness and other characteristics of the aqueous environment in which it is to be used. Ideally, this should be determined by test utilizing the actual formation water in which the material will be used. Generally from about 0.05 percent to about 5.0 percent and preferably from about 0.2 to about 0.5 percent by weight of the nonionic surfactant and from about 0.05 to about 5.0 percent and preferably from about 0.20 to 0.50 percent by weight of each of the anionic surfactants will be effective within the 1,500 to 12,000 parts per million hardness range of the aqueous environment. The ratio of alkyl polyethoxy sulfate anionic to nonionic surfactant will generally be about 1, whereas the weight ratio of alkylaryl sulfonate anionic surfactant to nonionic ratio will range about 8:1 to about 1:1. The ratio of alkylaryl sulfonate anionic surfactant to nonionic surfactant for optimum surface tension reduction is roughly inversely related to the total hardness. Although the best performances will result from experimentation using formation water, the values in Table I below are a general guideline for the ratio of alkylaryl sulfonate anionic to nonionic surfactant.

TABLE I

Weight percent ratio of components.

| Formation Water Total Hardness PPM | alkylaryl sulfonate anionic surfactant | alkyl poly- ethoxylated sulfate anionic surfactant | nonionic surfactant |
|---|---|---|---|
| 1,500–3,000 | 8 | 1 | 1 |
| 3,000–6,000 | 4 | 1 | 1 |
| 6,000–12,000 | 2 or 1 | 1 | 1 |

In the practice of our invention, from about 2 to about 50 pore volume percent of an aqueous solution containing from about 0.05 to about 5.0 percent and preferably from about 0.2 to about 0.5 percent of a nonionic surfactant such as a polyethoxylated aliphatic alcohol, a polyethoxylated alkyl phenol or a fatty acid diethanolamide, and from about 0.05 to about 5.0 and preferably from about 0.2 to about 0.5 percent by weight of the first anionic surfactant, specifically an alkyl or alkylaryl sulfonate, plus from about 0.05 to about 5.0 and preferably from about 0.2 to about 0.5 percent by weight of the second anionic surfactant, an alkyl polyethoxylated sulfate, is injected into the subterranean petroleum containing formation. The subterranean petroleum containing formation to which this invention will be applied will ordinarily be a limestone formation, although any formation having water containing from about 1,500 to about 12,000 parts per million calcium and/or magnesium can effectively be exploited by means of the subject process. Ordinarily, water injection will have been applied to the reservoir first, although this is not a requirement for the employment of this invention. Water injection or water flooding is, however, a desirable first phase of the recovery program for several reasons. It is less expensive to conduct than the surfactant flooding program, and furthermore, the injection of relatively fresh water into a formation containing connate water having high concentrations of calcium and/or magnesium will result in the lowering of the water hardness to a point where it will be more feasible to find a surfactant system which will effectively reduce the interfacial tension between the formation water and petroleum. As will be seen later hereinafter in this specification, it is not necessarily to be expected that the optimum interfacial tension reduction will be achieved at the lowest possible total water hardness. This furnishes still another reason for the desirability that actual experimentation be undertaken utilizing the available formation water or a relatively close facsimile thereof, to select the best surfactants and concentrations thereof, and also the optimum hardness at which the chosen composition will function.

In formations wherein it is known or expected that at least one of the surfactants will be adsorbed from solution onto the formation rock, it is necessary either to use a preflush of sacrificial inorganic material such as sodium carbonate or sodium polyphosphate, or to use more than the optimum concentration of surfactant as determined by capillary tests or other means. It is generally satisfactory to use up to 5 percent by weight surfactant, and this surplus material need only be added to the first ten percent or so of the surfactant slug injected. Both surfactants may tend to be absorbed by the formation, or there may be a preferential absorption of either the anionic or nonionic surfactants used, depending on the characteristics of the formation rock.

If the viscosity of the petroleum contained in the subterranean formation is sufficiently high, the ratio of viscosities of injected fluid to displaced fluid, or mobility ratio as it is referred to in the art of supplemental oil recovery, will result in an adverse sweep efficiency. In this case it will be necessary to utilize an additive to increase the viscosity of the injected aqueous fluid to more nearly match the viscosity of the subterranean petroleum. Hydrophilic polymers such as polyacrylamides or polysaccharides are effective for this purpose in concentrations from about 50 to about 2,000 parts per million in an aqueous solution. The use of this amount of polymer results in a fluid having an apparent viscosity of from about 5 to about 15 centipoise, which will generally improve the mobility ratio to a point that improved sweep efficiency can be achieved. It may be desirable to add a small concentration of the hydrophilic polymer to the surfactant solution, but it is generally satisfactory to follow the surfactant solution with a mobility buffer which comprises an aqueous solution of the hydrophilic polymer. This mobility buffer itself is then displaced through the formation by injecting water into the formation. Whether or not the mobility buffer solution is used, the final phase of the supplemental oil recovery operation will comprise the injection of water into the formation to displace the surfactant solution and the displaced oil through the formation to the producing well. Water injection will be continued until the water/oil ratio at the producing well rises to about 30 to 40.

The invention can be more fully understood by reference to the following field example, which is offered only for purpose of illustration and is not intended to be limitative or restrictive of the invention, which will be defined more precisely hereinafter in the claims.

FIELD EXAMPLE

A subterranean, petroleum containing limestone formation is found at a depth of 9,200 feet. The limestone formation is 40 feet thick and the porosity is 30 percent. The field is exploited first by primary production, utilizing a square grid pattern with 400 feet line spacing between wells. At the conclusion of primary recovery, which recovers only 25 percent of the original petroleum in place within the reservoir, water injection wells are drilled in the center of each square grid to convert the field to an inverted five spot pattern for water injection. Although a large field entails a multiplicity of the square grid patterns, each 400 feet on a side and with an injection well in the center, it is possible to analyze the entire field by considering only a single grid unit. Water is injected into the injection well and production of oil is continued from the production wells until the water/oil ratio reaches 30, which is considered to be the economic limit for continued production. At the conclusion of the water flooding operation, only 45 percent of the original oil in place in the reservoir has been recovered, and some form of tertiary recovery operation must be resorted to in order to obtain any significant portion of the remaining petroleum.

The formation water is analyzed and found to contain 5,000 parts per million calcium and 1,000 parts per million magnesium. Capillary displacement tests are performed using actual formation water and it is determined that no single anionic or nonionic surfactant can be used in water containing 6,000 parts per million total hardness. It is determined, however, that a three component surfactant system can be used, and the maximum capillary displacement results from the use of 0.60 percent by weight of ammonium lauryl benzene sulfonate, 0.30 percent by weight of a polyethoxylated sodium dodecyl sulfate, and 0.3 percent by weight of a lauric acid diethanolamide nonionic surfactant. Since the formation is known to adsorb both anionic surfactants, the first 10 percent of the surfactant slug will contain 4 percent by weight of each anionic surfactant, and the remainder of the slug will contain the above stated concentrations of each material.

Since the pattern used results in 70 percent sweep efficiency, the total pore volume swept by injected fluid is 400 Ft. × 400 Ft. × 40 Ft. × 0.30 × 0.70 = 1,344,000 Cu.Ft.

A 10 percent pore volume surfactant slug or 134,000 cu.Ft. or 1,047,000 gallons is used. The first 10 percent of this slug, or 104,700 gallons contains 4 percent by weight of each anionic surfactant. The balance of the surfactant solution contains 0.30 percent by weight sodium dodecyl polyethoxylated sulfate, 0.60 percent by weight ammonium laurylbenzene sulfonate, and 0.30 percent by weight lauric acid diethanolamide.

The surfactant solution is followed by injecting 1,000,000 gallons of an aqueous solution containing 200 parts per million of polyacrylamide, a hydrophilic polymer, to increase the viscosity of the injected aqueous fluid to about 8 centipoise. Finally, water is injected into the formation to displace the surfactant, thickened water solution, and the displaced oil through the formation toward the production wells. Water injection is continued until the water/oil ratio rises to about 30, at which point the residual oil saturation is reduced to 9 percent pore volume and approximately 90 percent of the original oil in place within the swept area is recovered.

EXPERIMENTAL

In order to establish the operability of this invention, and further to determine the optimum ratio of the essential constituents of the novel surfactant composition of our invention, the following experimental work was performed.

Simulated formation water was prepared to match as closely as possible the analysis of formation water obtained from the Cogdell Unit, Scurry County, Tex., which was under laboratory evaluation for possible application of the subject invention. The composition of the simulated formation water is given in Table II below.

TABLE II

SIMULATED LIMESTONE FORMATION CONNATE WATER COMPOSITION

| | |
|---|---|
| $CaSO_4$ | 0.97 Grams Per Liter |
| $CaCl_2$ | 17.6 Grams Per Liter |
| $MgCl_2 \cdot 6H_2O$ | 7.2 Grams Per Liter |
| $NaHCO_3$ | 0.33 Grams Per Liter |
| $NaCl$ | 94.0 Grams Per Liter |
| $Na_2SO_4$ | .985 Grams Per Liter |

The simulated formation water contained approximately 6,500 parts per million calcium and 850 parts per million magnesium ions. This synthetic formation water was used in the capillary displacement tests described immediately below.

Capillary displacement tests provide a convenient and accurate method for confirming the suitability of the novel three component surfactant system of this invention. The tests are performed by filling a number of closed end capillary tubes with the particular crude oil being studied, and submerging the capillary tubes horizontally into the desired aqueous phase. In the instance of the subject series of tests, the aqueous phase comprised the indicated synthetic formation water plus the surfactant mixture being evaluated. In each instance of displacement of oil by the aqueous phase, a meniscus was formed at the oil water interface. The only force tending to displace oil from the capillary tube was the force resulting from the difference in specific gravities of the two fluids. This force was offset by the interfacial tension between the oil and aqueous fluid, and it was observed that essentially no displacement occurred in the instance of formation water having no surfactant added thereto. When the surfactant composition was successful in producing a movement in the meniscus, the distance traveled by the meniscus in millimeters in a 5 minute exposure interval in the chemical system is recorded, and it is this displacement in millimeters that is given in Table II below, which will be described more fully hereinafter. There was essentially no displacement of the meniscus in the instance of capillary tubes submerged in the formation water containing no surfactant of any kind, indicating that the interfacial tension between the crude oil and the formation water was too great to permit displacement of the oil from the capillary. The maximum reduction in interfacial tension is indicated by the maximum value of the displacement observed in the capillary tubes.

TABLE III

CAPPILARY DISPLACEMENT TESTS - COGDELL UNIT CRUDE OIL (7,400 ppm water hardness)

| Concentration, weight percent | Material | Capillary Displacement, mm |
|---|---|---|
| 1. 0.2% | linear alkylaryl sulfonate | no displacement |
| 2. 0.4% | linear alkylaryl sulfonate | no displacement |
| 3. 0.8% | linear alkylaryl sulfonate | no displacement |
| 4. 0.2% | alkyl polyethoxylated sulfate | no displacement |
| 5. 0.4% | alkyl polyethoxylated sulfate | no displacement |
| 6. 0.8% | alkyl polyethoxylated sulfate | no displacement |
| 7. 0.2% | polyethoxylated alkylphenol | no displacement |
| 8. 0.4% | polyethoxylated alkylphenol | no displacement |
| 9. 0.8% | polyethoxylated alkyphenol | no displacement |
| 10. 0.4% +0.2% | linear alkylaryl sulfonate polyethoxylated alkyphenol | 1.0 |
| 11. 0.4% +0.4% | linear alkylaryl sulfonate polyethoxylated alkylphenol | 2.0 |
| 12. 0.4% +0.2% | linear alkylaryl sulfonate alkyl polyethoxylated sulfate | 1.2 |
| 13. 0.4% +0.4% | linear alkylaryl sulfonate alkyl polyethoxylated sulfate | 0 |
| 14. 0.4% +0.4% | polyethoxylated alkylphenol alkyl polyethoxylated sulfate | 0 |
| 15. 0.4% +0.2% +0.2% | linear alkylaryl sulfonate polyethoxylated alkylphenol alkyl polyethoxylated sulfate | 8.5 |
| 16. 0.2% | fatty acid diethanolamide | 0 |
| 17. 0.8% | fatty acid diethanolamide | 0 |
| 18. 0.4% +0.2% +0.2% | linear alkylaryl sulfonate polyethoxylated alkyl sulfate fatty acid diethanolamide | 6.5 |

In the experimental tests described in Table III, the linear alkylaryl sulfonate was the ammonium salt of a laurylbenzene sulfonate, the alkyl polyethoxylated sulfate was a sodium salt of an approximately 5 mole ethylene oxide adduct of dodecyl sulfate, the polyethoxylated alkylphenol was a 9.5 mole ethylene oxide adduct of nonylphenol and the alkyl diethanolamide was dodecyl diethanolamide.

It can be seen from the data contained in Table III above, that no capillary displacement resulted from the use of 0.2, 0.4 or 0.8 percent by weight of any one of the individual materials when used alone in the 7,400 parts per million total hardness aqueous solution. Similarly, runs 10 and 11 show that the linear alkylaryl sulfonate and polyethoxylated alkylphenol are not effective in this formation water. Runs 12 and 13 show that the linear alkylaryl sulfonate and alkyl polyethoxylated sulfate are not effective. Run 14 shows polyethoxylated alkylphenol and alkyl polyethoxylated sulfate do not function in this formation water. It can be seen in run 15, however, that the use of three materials, namely 0.4% by weight linear alkylaryl sulfonate plus 0.2 alkyl polyethoxylated phenol plus 0.2% by weight alkyl polyethoxylated sulfate results in a substantial capillary displacement. Similarly, runs 16 and 17 show neither 0.2% nor 0.8% of a fatty acid diethanolamide in the simulated formation water containing 7,400 ppm calcium plus magnesium produces capillary displacement. Run 18, however, illustrates that the simulated formation water to which has been added 0.4% linear alkylaryl sulfonate, 0.2% alkyl polyethoxylated sulfate and 0.2% fatty acid diethanolamide does produce a significant capillary displacement. Thus it is clear from the data that no interfacial tension reduction results from the use of any one of these materials alone, or from the use of a combination of any two of them, but interfacial tension reduction is achieved by the use of all three. The conclusion is inescapable that the three materials interact synergistically to produce a result not obtainable by the use of any one or two materials alone.

Another series of capillary displacement tests was performed using simulated formation water prepared to match as closely as possible the anlysis of formation water obtained from the Slaughter Field, Hockley County, Texas, which was also under laboratory evaluation for possible application of the subject invention. The composition of the simulated formation water is given in Table IV below.

TABLE IV

SIMULATED LIMESTONE FORMATION
CONNATE WATER COMPOSITION

| | |
|---|---|
| $CaSO_4$ | 0.97 Grams Per Liter |
| $CaCl_2$ | 40.65 Grams Per Liter |
| $MgCl_2 \cdot 6H_2O$ | 34.60 Grams Per Liter |
| $NaHCO_3$ | 0.40 Grams Per Liter |
| NaCl | 161.90 Grams Per Liter |

Some precipitation of salts occurred, however, the water was saturated with divalent cations of the various salts used in formulated the formation water, and contained approximately 15,000 parts per million calcium and 4,500 parts per million magnesium ions. This synthetic connate water was used in varying dilutions in all of the capillary displacement tests described below.

In FIG. 1 there is illustrated the capillary displacements obtained in a series of tests using 30 percent of the simulated formation connate water whose composition is given in Table IV and varying concentrations of an aqueous solution containing the three component surfactant system of our invention. The diluted connate water contained approximately 6,000 parts per million total hardness and the aqueous surfactant solution contained approximately 15 percent by weight ammonium laurylbenzene sulfonate, 8.5 percent by weight ammonium lauryl polyethoxylated sulfate, and 8.5 percent lauric acid diethanolamide. As can be seen in FIG. 1, the capillary displacement increased with increasing amounts of surfactant solution to a maximum value between 3 and 5 volume percent, which corresponds to a concentration of from 0.45 to 0.75 percent by weight of the ammonium laurylbenzene sulfonate, and from 0.24 to about 0.40 percent by weight of the ammonium laurylpolyethoxylated sulfate and from 0.24 to 0.40 percent by weight of the lauric acid diethanolamide.

In FIG. 2, the results are given for a series of capillary displacement tests using 4 volume percent of the surfactant solution described above, with varying dilutions of the simulated connate water whose composition is given in Table IV. It can be seen that the maximum capillary displacement corresponds to from about 30 percent to 40 percent connate water, or to about 6,000 to 8,000 parts per million total hardness. Not only is this three component mixture effective in this range, but it is relatively ineffective substantially above or below this hardness range. The performance can be improved in solutions having more or less calcium plus magnesium by varying the ratios of components according to Table I.

Corresponding capillary displacement tests similar to those described above and in the same aqueous environment using only petroleum sulfonate for the surfactant could not be performed because of the immediate precipitation of petroleum sulfonate on contacting the aqueous solutions containing the high concentrations of calcium and magnesium that are involved in these tests.

In order to study the displacement performance of the optimum composition of the mixture of the three components described above, laboratory displacement tests were conducted on a radial core obtained from the 5022–5024 depth of the San Andreas formation in the Bob Slaughter Field, Hockley County, Tex., which is essentially a Dolomitic formation. The core was approximately 4 inches in outside diameter and had an inside bore diameter of 0.5 inches, and was approximately 4 inches long. The porosity was in the range of 20 percent and the permeability was around 12 millidarcies. Pressure depletion recovery corresponding to primary recovery was done first, and then the core was flooded with either untreated water or with an aqueous solution of the three component surfactant system of our invention. The waterflood test was conducted to determine the response to a conventional water flood conducted to breakthrough of the injected water in order to obtain a comparison of the results obtained using treated and untreated water. In each test the clean, evacuated radial core was filled with simulated connate water which was then displaced by stock tank oil obtained from the Slaughter Field to establish initial oil saturation. Both floods were performed at a constant rate of 20 milliliters per hour, and the results obtained are given in FIG. 3. It can be seen that the optimum recovery using a conventional waterflood was in the range of 60 percent, whereas approximately 90 percent recovery was attained utilizing the three surfactant composition of our invention. In each instance the end point of the test was determined by the water-oil ratio, which is also graphically related in FIG. 3. It can also be seen that the residual oil saturation in the formation, which is expressed as a percent of total pore volume, is reduced to a substantial lower figure utilizing our novel surfactant flood than is possible in the instance of conventional waterflood. The use of this surfactant composition resulted in the recovery of approximately 50 percent more oil than was possible by employing conventional water-flooding techniques.

Thus, we have disclosed and demonstrated in laboratory experiments that the use of an aqueous solution containing from 0.05 to 5.0 percent of a nonionic surfactant plus from 0.05 to 5.0 percent by weight of a water soluble salt of a linear alkylaryl sulfonate plus from 0.05 to about 5.0 percent of an alkyl polyethoxylated sulfate will effectively function as a surfactant in aqueous solution to reduce the interfacial tension between crude oil and water in the presence of hard water, e.g., water having from about 1,500 to about 12,000 parts per million total hardness (calcium plus magnesium). While test results of only one particular alkylaryl sulfonate anionic surfactant and only one water soluble salt of an alkyl polyethoxylated sulfate and two nonionic surfactants have been disclosed, many other such materials will be apparent to those skilled in the art of surfactant flooding oil recovery, and it is intended that the true spirit and scope of this invention be determined only by the claims which are appended hereinafter below.

We claim:

1. In a method for recovering petroleum from a subterranean, petroliferous, porous formation, penetrated by at least one injection well and at least one production well, said formation containing water having polyvalent ions including calcium and magnesium dissolved therein in a concentration of from about 1,500 to about 12,000 parts per million, said recovery method being of the type wherein an aqueous fluid is injected into the formation via the injection well, and oil displaced by the injected fluid is recovered from the formation via the production well, wherein the improvement comprises injecting into the formation an aqueous surfactant solution comprising:
   a. a first anionic surfactant selected from the group consisting of alkyl sulfonates containing from five to 25 carbon atoms and alkylaryl sulfonates wherein said alkyl constituent contains from five to 25 carbon atoms, and petroleum sulfonate,
   b. a second anionic surfactant comprising a water soluble salt of an alkyl polyethoxy sulfate containing from one to 10 ethoxy groups, said alkyl constituent containing from seven to 20 carbon atoms, and
   c. a nonionic surfactant selected from the group consisting of polyethoxylated alkylphenols having from six to 20 ethoxy groups, said alkyl group containing from five to 20 carbon atoms, polyethoxylated aliphatic alcohols containing from five to 20 carbon atoms and from six to 20 ethoxy groups, fatty acid dialkanolamides and fatty acid monoalkanolamides wherein said fatty acid contains from five to 20 carbon atoms.

2. A method as recited in claim 1 wherein a cation is associated with the first anionic surfactant, said cation being independently selected from the group consisting of sodium, potassium and ammonium.

3. A method as recited in claim 2 wherein the cation is ammonium.

4. A method as recited in claim 2 wherein the cation is sodium.

5. A method as recited in claim 1 wherein said second anionic surfactant is associated with a cation selected from the group consisting of ammonium, potassium and sodium.

6. A method as recited in claim 5 wherein said cation is sodium.

7. A method as recited in claim 5 wherein said cation is ammonium.

8. A method as recited in claim 1 wherein the alkyl chain of the first anionic surfactant contains from eight to 14 carbon atoms.

9. A method as recited in claim 1 wherein the alkyl chain of the second anionic surfactant contains from eight to 14 carbon atoms.

10. A method as recited in claim 1 wherein the alkyl chain of the nonionic surfactant contains from eight to 14 carbon atoms.

11. A method as recited in claim 1 wherein the first anionic surfactant is the ammonium salt of dodecylbenzene sulfonate.

12. A method as recited in claim 1 wherein the first anionic surfactant is the ammonium salt of laurylbenzene sulfonate.

13. A method as recited in claim 1 wherein the first anionic surfactant is petroleum sulfonate.

14. A method as recited in claim 1 wherein the second anionic surfactant is sodium dodecyl polyethoxy sulfate.

15. A method as recited in claim 1 wherein the nonionic surfactant is a polyethoxylated nonylphenol having from nine to 10 ethoxy groups.

16. A method as recited in claim 1 wherein the nonionic surfactant is a fatty acid diethanolamide.

17. A method as recited in claim 16 wherein the fatty acid diethanolamide is lauryldiethanolamide.

18. A method as recited in claim 1 wherein the nonionic surfactant is dodecyldiisopropanolamide.

19. A method as recited in claim 1 wherein the nonionic surfactant is dodecylmonoisopropanolamide.

20. A method as recited in claim 1 wherein the nonionic surfactant is dodecylmonoethanolamide.

21. A method as recited in claim 1 wherein the concentration of the first anionic surfactant in the surfactant solution is from about 0.05 to about 5.0 percent by weight.

22. A method as recited in claim 1 wherein the concentration of the first anionic surfactant is from about 0.20 to about 0.50 percent by weight.

23. A method as recited in claim 1 wherein the concentration of the second anionic surfactant is from about 0.05 to about 5.0 percent by weight.

24. A method as recited in claim 1 wherein the concentration of the second anionic surfactant is from about 0.2 to 0.5 percent by weight.

25. A method as recited in claim 1 wherein the concentration of nonionic surfactant in the aqueous surfactant solution is from about 0.05 to about 5.0 percent by weight.

26. A method as recited in claim 1 wherein the concentration of nonionic surfactant is from about 0.20 to about 0.50.

27. A method as recited in claim 1 wherein the ratio of first anionic surfactant concentration to the nonionic surfactant concentration is from about one to about eight.

28. A method as recited in claim 1 wherein the aqueous surfactant solution also has dissolved therein a hydrophilic polymer selected from the group consisting of polyacrylamide and polysaccharide in sufficient concentration to increase the viscosity of the aqueous surfactant solution.

29. A method as recited in claim 1 wherein the aqueous surfactant solution is followed by the injection of an aqueous solution having dissolved therein sufficient hydrophilic polymer selected from the group consisting of polyacrylamide and polysaccharide to increase the viscosity of the injected aqueous solution to a value greater than the viscosity of the formation water.

30. A method as recited in claim 1 wherein the concentration of at least one of the surfactants is greater in the first portion of surfactant solution injected into the formation than in the latter portion.

* * * * *